April 10, 1956  F. W. BARTON  2,741,339
BRAKE BAND WITH REMOVABLE LINING
Filed April 23, 1953
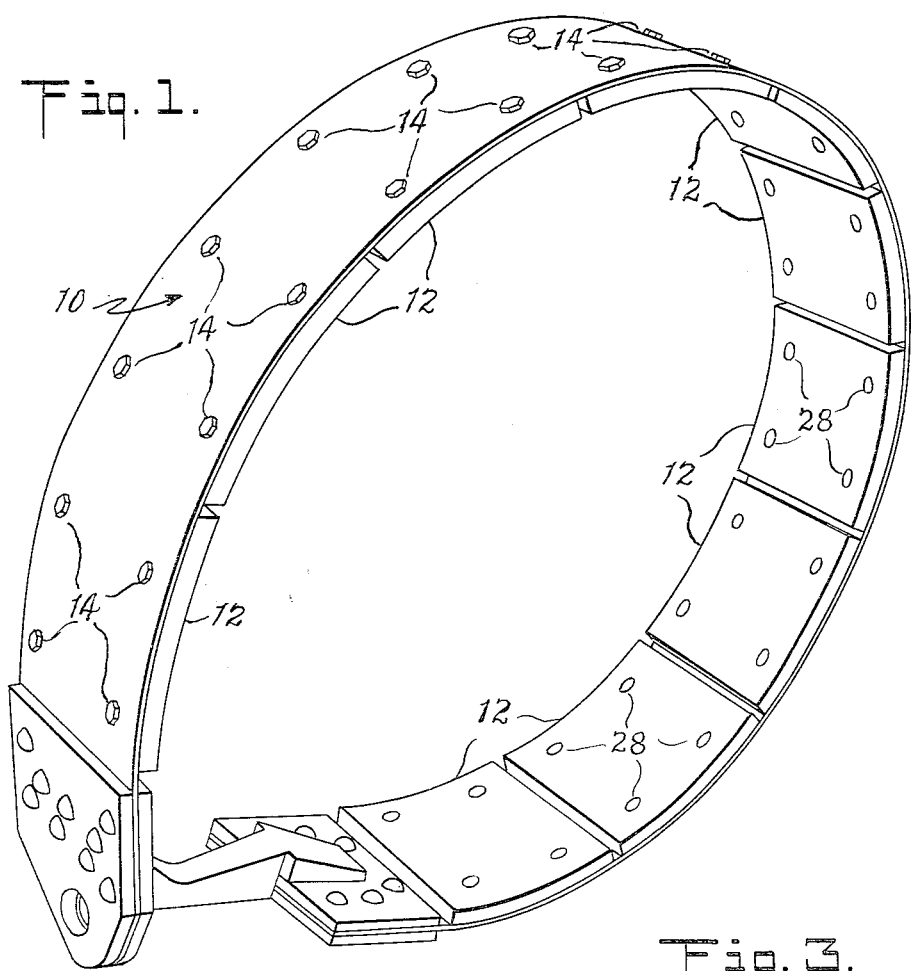
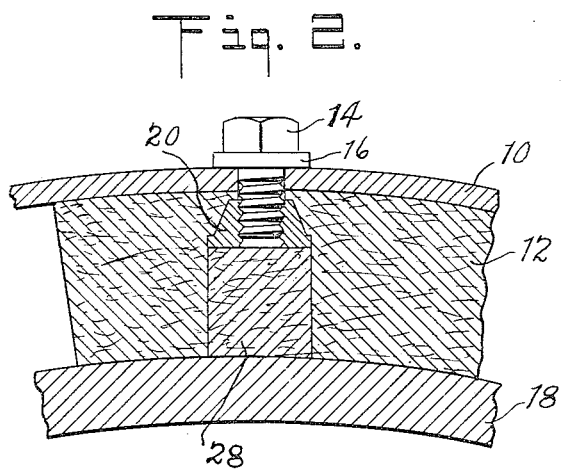
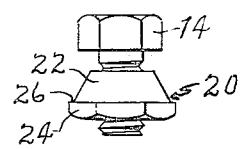
INVENTOR.
FRANK W. BARTON
BY
Davis, Hoxie & Faithfull
ATTORNEYS

United States Patent Office 2,741,339
Patented Apr. 10, 1956

2,741,339
BRAKE BAND WITH REMOVABLE LINING

Frank W. Barton, Townley, N. J.

Application April 23, 1953, Serial No. 350,701

1 Claim. (Cl. 188—249)

In the drilling of an oil well it is the usual practice to maintain a loading upon the bit which is less than the loading which would result from the weight of the string supporting the bit, the difference between the loadings being taken up by the brakes upon the winch drum by means of which the string is lowered or lifted from the well. As it is impossible for the water brake generally used to bring the string to a dead stop, it is also necessary to use an additional brake of the friction type which ordinarily consists of a brake band upon whose inner surface are secured a plurality of friction blocks of treated asbestos that are brought into contact with the brake drum by means of a manually operated lever. As usually constructed, the blocks are secured to the band by bolts or machine screws which are inserted in stepped apertures in the block with the threaded ends thereof extending through aligned apertures in the brake band to engage correlated nuts upon the outer surface of the brake band. When this construction is used, the friction blocks cannot be replaced without disassembling the brake band from the remainder of the winch so that the bolts can be removed from the apertures in the blocks, a time consuming two-man operation which if not performed carefully may distort the heavy band and which is the more objectionable because an expensive drilling rig is tied up during the time the change is being made.

It is therefore the object of the present invention to provide a brake friction block and means for attaching the same which permits the block to be renewed without the necessity of removing the supporting band from the winch, which can be used upon present apparatus without modification thereof, which result in a superior block, which reduce wear and galling of the brake drum, and which advance the art generally.

These and other objects will be apparent from the following description of a presently preferred embodiment of the invention which refers to drawings wherein:

Fig. 1 is an isometric view showing the friction blocks attached to the inner surface of a brake band;

Fig. 2 is an enlarged fragmentary sectional view showing the means of attachment of one of the blocks to a band; and Fig. 3 is an enlarged side elevation view of the cap screw and associated nut shown in Fig. 2.

The particular embodiment of the invention chosen for the purpose of illustration is particularly adapted for use in connection with the friction brake of the drum of a winch such as is used on an oil well drilling rig, although it is to be understood that the invention is not limited thereto. As the winch may be of any of the conventional types and forms no part of the present invention, only one brake band 10 thereof is illustrated in Fig. 1. Secured to the inner surface of the band 10, in a manner which will be described in detail hereinafter, is a brake lining comprising a plurality of rectangular friction brake blocks 12 which may be either woven or molded of treated asbestos in any of the various manners well known to those skilled in the art. Each of the blocks 12 has four spaced apertures extending therethrough and aligning with corresponding apertures in the brake band 10 to receive cap screws 14 of brass or other relatively soft material. A lock washer 16 is inserted respectively between the outer surface of the band 10 and the hex head of each of the cap screws 14.

As can best be seen in Fig. 2, the wall of each of the apertures is stepped at an intermediate point so as to increase the diameter forming the equivalent of a counterbore. This counterbore extends from the effective braking surface of the block disposed adjacent the brake drum 18 inwardly towards the opposite surface of the block which has a curvilinear configuration to conform to the abutting inner supporting surface of the brake band 10.

A nut 20 having an internal thread is disposed at the bottom of each of the respective counterbores, preferably forceably inserted therein by means of a press. As shown in Fig. 3, the nut 20 has a conical portion 22 which has a taper of substantially thirty degrees with respect to the axis of the nut which extends approximately three-quarters of the longitudinal length thereof. The remainder of the nut 20 is in the form of a hexagon whose dimensions are such that the points on the periphery thereof project into the wall of the counterbore as the nut 20 is pressed therein as described above thereby to prevent the nut from rotating as the cap screw 14 is threaded therein. The depth of the counterbore is made such that when the shoulder 26 separating the conical and hexagonal portions of the nut 20 comes up against the step formed by the difference in diameters of the counterbore and the remainder of the aperture, the smaller end of the conical portion is positioned slightly beneath the surface of the block abutting the band 10. In the above described position the entire area of conical portion 22 bears against the material of the block to decrease materially the possibility of shearing the block if too great a tightening force should be inadvertently applied to the cap screw 14.

The length of the shank of the cap screw 14 is proportioned with respect to the thickness of the brake band 10 so that when the head thereof is drawn snugly against the washer 16, the opposite end of the shank does not extend through the threaded aperture of the nut 20 but stops short of the bottom surface thereof. This feature eliminates the projection of the sharp edges of the shank thread and materially reduces the scoring of the brake drum 18 if the block is inadvertently worn down to the nut before changing.

After each of the nuts 20 has been pressed into place the open space beneath the nut is closed by means of a cylindrical plug 28 of the same material as the block 10. The closing of the space beneath the nut 20 prevents the collecting of dirt or other foreign material in such space which otherwise tends to cause wear and scoring of the brake drum 18. The plugs 28 serve the additional purpose of indicating if bolts 14 of the wrong length are used. As the plugs 28 normally bottom on the lower end of the respective nuts 20, the opposite end thereof is raised above the effective braking surface of the block if a bolt with a longer shank than required is used, thus providing a simple visual means to check for projecting shank ends which might cause scoring of the drum.

My improved brake lining can be changed quickly and easily without the necessity of disassembling the brake band 10 from the winch. With the brake released, the cap screws 14 are removed and the worn blocks removed by slipping them out sideways from between the band 10 and the drum 18. As each worn block is taken out, it is replaced by a new block which is secured in position by simply replacing the cap screws.

It will be evident that the above described operation can be completed in much less time than is required to replace the usual linings which require that the brake band be removed from around the drum in order to reach the recessed securing bolts. Any tendency of the band to become distorted or to spring out of shape is also eliminated. It will also be evident that my invention is not limited to brakes wherein the lining is applied to the inside surface of a band, tube or shoe, but that the principles thereof are equally applicable to linings mounted upon the outside of a band, tube or shoe, and to other frictionally operated devices such as clutches.

It should be understood that the present disclosure is for the purpose of illustration only and that this invention includes all modifications and equivalents which fall within the scope of the appended claim.

I claim:

For mounting upon the inner surface of a supporting band of a frictionally operable mechanical device such as a brake, a lining comprising a plurality of friction blocks having a configuration conforming to that of the supporting band and having a plurality of apertures having a tapered side wall portion and extending respectively through each of the blocks in a direction substantially normal to the braking surfaces thereof, said apertures having a spaced relationship to align with corresponding apertures which extend through the band, and means for detachably securing the blocks to the band, said securing means including a plurality of internally threaded nuts each of which is provided with an external conical bearing surface, each of the nuts being recessed in a respective block aperture with the conical bearing surface in forceable engagement with the corresponding tapered side wall portion with the smaller end of the conical bearing surface adjacent the supporting band being spaced slightly therefrom so that the entire nut is disposed beneath the surface of the block, a plug of the same material as the blocks inserted respectively in each of the block apertures to close the space in the aperture beneath the correlated nut thereby preventing the collection of foreign matter in such space, said plugs being slidable in and removable from the apertures and a plurality of cap screws projecting through the apertures in the band so that the end of the shank of each thereof enters the small end of the conical portion of a respective nut to engage its threads, the shank of each of the screws being of such a length that the end thereof does not extend beyond the opposite end of the correlated nut whereby the cap screws are removable to permit the blocks to be withdrawn laterally from between the band and associated brake drum without disassembling the band from the device.

References Cited in the file of this patent

UNITED STATES PATENTS

| | | |
|---|---|---|
| 802,617 | Whitcomb | Oct. 24, 1905 |
| 1,537,234 | Hartman et al. | May 12, 1925 |
| 1,677,372 | Ruhling | July 17, 1928 |
| 1,901,696 | Bodine | Mar. 14, 1933 |
| 1,912,684 | Blume | June 6, 1933 |
| 1,917,820 | Brackett | July 11, 1933 |
| 1,952,903 | Blume | Mar. 27, 1934 |
| 2,438,483 | Tack | Mar. 23, 1948 |